(12) United States Patent
Ontko

(10) Patent No.: US 7,721,063 B2
(45) Date of Patent: May 18, 2010

(54) SYSTEM, METHOD AND PROGRAM FOR CONFIGURING A DATA MIRROR

(75) Inventor: Keith Alan Ontko, Avon, CT (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 11/566,843

(22) Filed: Dec. 5, 2006

(65) Prior Publication Data
US 2008/0133856 A1 Jun. 5, 2008

(51) Int. Cl.
G06F 12/00 (2006.01)
(52) U.S. Cl. ........................ 711/170; 711/114; 711/162; 711/E12.001
(58) Field of Classification Search ........................ None
See application file for complete search history.

(56) References Cited

U.S. PATENT DOCUMENTS

| | | | |
|---|---|---|---|
| 5,568,629 A * | 10/1996 | Gentry et al. | 711/114 |
| 6,574,709 B1 | 6/2003 | Skazinski et al. | 711/119 |
| 2002/0044553 A1 | 2/2002 | McCabe et al. | 709/203 |
| 2002/0138696 A1 | 9/2002 | Kodama et al. | 711/114 |
| 2004/0123063 A1 * | 6/2004 | Dalal et al. | 711/170 |
| 2004/0268069 A1 | 12/2004 | Satoyama et al. | |

* cited by examiner

Primary Examiner—Reginald G Bragdon
Assistant Examiner—Larry T MacKall
(74) Attorney, Agent, or Firm—Arthur J. Samodovitz

(57) ABSTRACT

System, method and program for data mirroring. In response to identification of a new storage volume on a primary storage subsystem being designated for use, a plurality of parameters for the new storage volume needed for data mirroring are automatically determined. Also, a corresponding storage volume in a second storage subsystem to mirror data from the new storage volume in the primary storage subsystem is automatically determined. The parameters of the new storage volume are automatically entered in a data mirroring table. The table identifies the new storage volume, the parameters for the new storage volume and the corresponding storage volume. The table also maps the new storage volume to the corresponding storage volume such that data updates to the new storage volume are mirrored to the corresponding storage volume. The parameters for the new storage volume can be determined by determining that a prior storage volume and a subsequent storage volume in the primary storage subsystem have same values for the parameters. In response, these values are entered for the parameters for the new storage volume in the data mirroring table.

12 Claims, 4 Drawing Sheets

SYSTEM, METHOD AND PROGRAM FOR CONFIGURING A DATA MIRROR

FIELD OF THE INVENTION

The present invention relates generally to computer systems and data mirroring, and more specifically to configuring a data mirror.

BACKGROUND OF THE INVENTION

It was well known to backup critical data to nonvolatile disk storage for recovery purposes. There are a variety of known techniques to create backup or secondary copies of data. A known data "mirroring" technique involves physically copying or mirroring a set of disk volumes from a primary disk storage subsystem from which it is used during normal operations to secondary and/or tertiary disk storage subsystem(s). Typically, the primary storage subsystem resides at a primary (geographic) site and the secondary and/or tertiary storage subsystems reside at a secondary and/or tertiary (geographic) site, and the data mirroring occurs via a network between the different sites. To implement data mirroring, a data mirroring management program at the primary site maps pairs of corresponding disk volumes in the primary and secondary storage subsystems (or maps triplets of corresponding disk volumes in the primary, secondary and tertiary storage subsystems if all provided). The mapping indicates where data created and stored in the primary storage subsystem is mirrored to the secondary storage subsystem (and tertiary storage subsystem, if provided). A disk "volume" can be a named logical disk drive that holds computer data that can be made up of one or more physical disk drives. After such a mapping, data updates made at the primary storage subsystem are automatically copied to the secondary storage subsystem (and tertiary subsystem, if provided).

The data mirroring management program needs the following information for both the primary and secondary disk storage systems (and tertiary disk storage subsystem, if provided) to support a data mirroring process, i.e. establish a mapping between the primary and secondary storage systems and enable physical mirroring of data: storage system serial numbers, network identifications, network connection information, and other internal identifiers of subsystem IDs, internal addresses, and Logical Control Unit IDs. The following is other configuration information for the primary and secondary storage systems that may also be needed: Worldwide Nodenames, pooling Assignment numbers and Channel Connection Addresses. Presently, an administrator manually collects the foregoing information by paper documentation and querying the disk subsystem. Based on this information, the administrator creates commands at the primary system to define which disk volumes in the primary subsystem are mirrored to which disk volumes in the secondary storage subsystem (and tertiary storage subsystem, if provided), record the mirror information in a mirroring table and initiate the mirroring. The commands include the following:

Peer-Peer Remote Copy (PPRC) commands;

CESTPATH: Establish a PPRC physical link connection between a primary side Logical Control Unit(LCU) and a remote side LCU CESTPAIR: Establish a PPRC mirror pair between a primary side volume and a remote side volume Global Mirror commands;

RSESSION-START: Start command to establish the mirror session in a global mirror RSESSION-PAUSE: Pause the mirror session so it does not attempt synch point RSESSION-RESUME: Resume the mirror to take a synch point RVOLUME: Define a volume to the global mirror that has already been established with a PPRC CESTPAIR command RSESSION-DEFINE: Add a Logical Control Unit (LCU) to the global mirror configuration Flashcopy Commands:

FCESTABL: Establish a flashcopy relationship between the secondary PPRC volume at the remote side and a tertiary volume at the remote side.

Also, disk volumes occasionally need to be added to or removed from the primary and/or backup system. In such a case, the administrator needs to define and execute new commands to reflect the new or removed disk volumes.

An existing IBM Global Mirror Executive ("GME") program implements data mirroring in IBM servers running an IBM z/OS operating system. The IBM GME program provides the following features:

Initiates and Monitors the Entire Global Mirror Session.

Detects and adds new production volumes to the mirror with no manual intervention.

Operates in either "Modeling" mode or "Execution" mode.

Detects problems with the mirror and fixes them (if possible).

Reports via alert message any problems.

Detects and corrects (if possible) configuration problems.

Generates information and commands required for recovery.

Provides management reporting on data synchronization.

The IBM Global Mirroring Executive program operates as follows: GME program operates in an IBM Z/OS MVS system, running as a 'started task'. At startup, GME program reads in configuration files, a parameter options file, and a dynamically built 'current disk volume' file. GME program builds internal tables and checks to determine if all volumes that are supposed to be part of the mirror are actually included in the mirror as it is currently running. GME program will then take the following actions as required to ensure the mirror is functional: check the status of each mirrored volume pair, check the status of the secondary/tertiary volume pairs, and check the status of the mirror structure. Thus, an administrator must manually define the pairs (or triplets) of disk volumes in a primary storage subsystem and a secondary storage subsystem (and a tertiary storage subsystem if provided). The following are existing commands and parameters input by an administrator to define the initial data mirroring and subsequently change the data mirroring to reflect changes to existing disk volumes in either the primary or backup system: CESTPATH, CESTPAIR, RSESSION START, and RSESSION DEFINE, RVOLUME. The IBM GME program also monitors the data mirroring, responds to events such as New Volumes, removed volumes, offline paths, invalid states of volume pairs, configuration and mismatches by taking the required action appropriate for each event. This could be adding the new volume to the mirror, removing a volume address from the mirror (in case the volume no longer exists), bringing paths online, etc. IBM GME also generates a recovery solution, i.e. generating required sets of commands and data to recover at the secondary location in the event of an outage.

An existing IBM eRCMF solution functions mainly as an "open systems" mirroring management tool. It will establish a mirror based on command input from an administrator. Its main function is to process the 'revert commands' at the remote DR site in the event of a primary site failure.

An object of the present invention is to facilitate the configuration of a data mirror.

SUMMARY OF THE INVENTION

The present invention resides in a system, method and program for data mirroring. In response to identification of a new storage volume on a primary storage subsystem being designated for use, a plurality of parameters for the new storage volume needed for data mirroring are automatically determined. Also, a corresponding storage volume in a second storage subsystem to mirror data from the new storage volume in the primary storage subsystem is automatically determined.

According to a feature of the present invention, the parameters of the new storage volume are automatically entered in a data mirroring table. The table identifies the new storage volume, the parameters for the new storage volume and the corresponding storage volume. The table also maps the new storage volume to the corresponding storage volume such that data updates to the new storage volume are mirrored to the corresponding storage volume.

According to another feature of the present invention, the parameters for the new storage volume are determined by determining that a prior storage volume and a subsequent storage volume in the primary storage subsystem have same values for the parameters. In response, these values are entered for the parameters for the new storage volume in the data mirroring table.

According to another feature of the present invention, the parameters for the new storage volume are determined by determining that a prior storage volume and a subsequent storage volume in the primary storage subsystem have nearly contiguous values for one of the parameters identifying respective logical control units. In response, a midpoint of the nearly contiguous values is entered as a logical control unit parameter for the new storage volume in the data mirroring table.

DETAILED DESCRIPTION OF THE PREFERRED EMBODIMENTS

Figure 1:
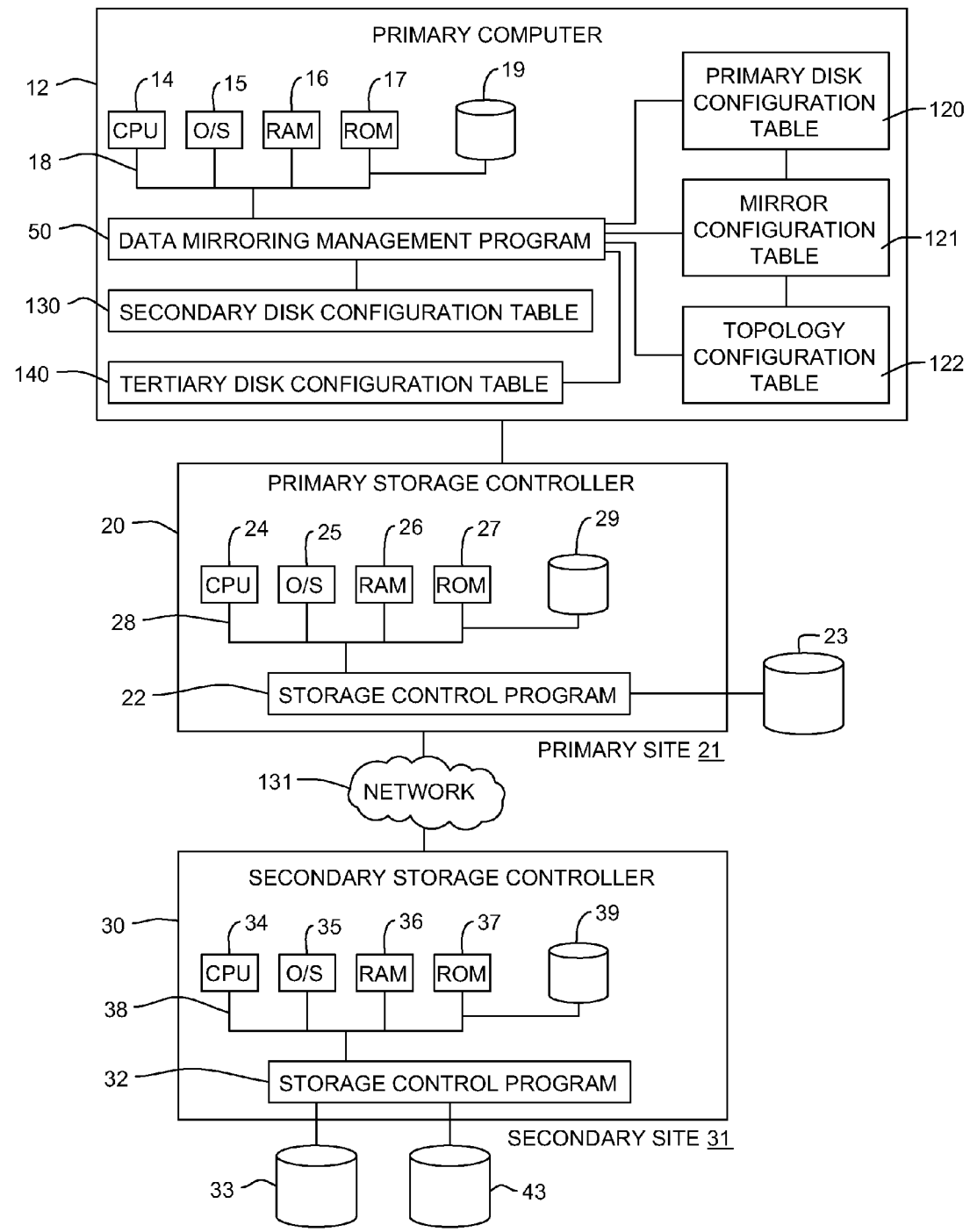
FIG. 1 is a block diagram of a distributed computer system for mirroring data from a primary storage subsystem to a secondary storage subsystem (and a tertiary storage subsystem), according to the present invention.

The present invention will now be described in detail with reference to the figures. FIG. 1 illustrates a distributed computer system, generally designated 10, which embodies the present invention. Distributed computer system 10 comprises a primary computer 12 and a primary storage controller 20 with an external, primary disk storage subsystem 23 at a primary site 21. Computer 12 updates data and sends it to storage controller 20 for storage in primary storage subsystem 23. Storage subsystem 23 comprises a multitude of individual primary disks. The Storage Controller divides and organizes the primary disks into volumes based on an initial setup when the storage subsystem 23 is first installed. Internally, computer 12 includes a processor 14, operating system 15, RAM 16 and ROM 17 on a common bus 18, and internal storage 19 as well. By way of example, operating system 15 is an IBM z/OS operating system. Storage controller 20 includes a processor 24, operating system 25, RAM 26 and ROM 27 on a common bus 28, and internal storage 29 as well. A primary disk configuration table 120 contains configuration information for disk volumes within primary computer 12. By way of example, the operating system 25 includes the following features to support data mirroring: PPRC version 2 (which is underlying microcode in the storage subsystem that handles the basic mirroring function between two disk volumes) and Flashcopy version 2 (which is underlying microcode in the storage subsystem that handles the functions of internal volume replication.) A data mirroring management program 50 within primary storage controller 20 manages data mirroring from primary storage subsystem 23 to a secondary storage subsystem 33 and a tertiary storage subsystem 43 at a secondary site 31 as described in more detail below. Data mirroring management program 50 is stored in computer readable storage media 19 for execution by CPU 14 via computer readable memory 16. Storage controller 20 includes a storage controller program 22 which provides the following known functions: cache management, disk management, I/O load balancing, and other features common to a storage controller. Storage control program 22 is stored in computer readable storage media 29 for execution by CPU 24 via computer readable memory 26.

Distributed computer system 10 also comprises a secondary storage controller 30 with a secondary storage subsystem 33 at a secondary site 31. Secondary storage controller 30 is coupled to primary storage controller 20 via a network 131. Storage subsystem 33 comprises a multitude of individual disks for mirroring. The Storage Controller 30 divides and organizes the secondary disks into volumes based on setup of the secondary storage subsystem 33 at installation time. Storage controller 30 includes a processor 34, operating system 35, RAM 36 and ROM 37 on a common bus 38, and internal storage 39 as well. Storage controller 30 includes a storage controller program 32 which provides the following known functions: cache management, disk management, I/O load balancing, and other features common to a storage controller. Storage controller 30 also manages the data mirroring of logical volumes between primary and secondary at the hardware level.

Distributed system 10 also comprises a tertiary set of disk volumes 43 and are controlled by storage controller 30. The function of tertiary storage subsystem 43 is to maintain a "point in time" copy of the data in secondary storage subsystem 33, in case both the primary storage subsystem 23 and secondary storage subsystem 33 fail entirely, or the same volume in both the primary storage subsystem and the secondary subsystem are not accessible.

When primary computer 12 updates data in primary storage subsystem 23, data mirroring management program 50 within primary computer 12, identifies available disk volumes in secondary storage subsystem 33 and tertiary storage subsystem 43 to which to mirror the data updates. Program 50 generates commands to establish correlations or mirror mappings between available disk volumes in primary subsystem 13 and corresponding available disk volumes in secondary subsystem 33 and tertiary subsystem 43. These commands indicate which disk volume in secondary storage subsystem 33 should contain the mirrored data from which disk volume in primary storage subsystem 23, and which disk volume in tertiary storage subsystem 43 should contain the mirrored data from which disk volume in primary storage subsystem 23 so that each disk volume in the primary storage subsystem is mapped to a corresponding disk volume in the secondary storage subsystem and a corresponding disk volume in the tertiary storage subsystem. Storage controller 20 uses the mappings defined by program 50 to determine where to backup or mirror data updates from the primary storage subsystem. Thus, once each triplet is defined, when primary computer 12 updates any data in a primary disk volume, primary storage controller 20, based on the correlations/mappings previously established by program 50, automatically (asynchronously) sends the updates to secondary storage controller 30 and tertiary storage subsystem 33 via network 11 for update to the secondary disk volume and tertiary disk volume of the same triplet. Also, occasionally, an administrator adds disk volumes to or removes disk volumes from the primary storage subsystem. In response, program 50 detects the additions or deletions and automatically generates new commands to reflect these changes in the mappings to ensure that every disk volume in the primary storage subsystem that is used for production is mapped to a corresponding disk volume in the secondary storage subsystem and a corresponding disk volume in the tertiary storage subsystem. This maintains proper correlations/mappings between each primary disk volume and the corresponding secondary disk volume and tertiary disk volume.

The data mirroring management program 50 obtains the following information for the primary, secondary and tertiary disk storage subsystems to support the data mirroring process, establish a link between the primary, secondary and tertiary disk storage subsystems and enable the physically mirroring of data: storage system serial numbers, network identifications, network connection information and other internal identifiers of subsystem ID, channel connection address and Logical subsystem number. Program 50 obtains the foregoing information (by query) from Primary Disk Configuration Table 120, Mirror Configuration Table 121 and Topology Configuration Table 122 in the primary subsystem 20, (by network request message) from one or more Secondary Disk Configuration Tables 130 also in the primary computer 12, and from one or more Tertiary Disk Configuration tables 140 also in the primary computer system 12. The following are examples of the information in tables 120-122, 130 and 140:

Primary Disk Configuration Table 120 contains a detailed description of valid source disk information from primary storage subsystem 23. The source disk information comprises storage device serial numbers, valid storage address ranges, logical control units (LCUs), a subsystem ID for each LCU and a worldwide node name for the disk subsystem. Storage controller 20 uses the foregoing information to establish connectivity between the primary storage subsystem 23 and the secondary storage subsystem 33, and between the secondary subsystem 33 and the tertiary storage subsystem 43.

Secondary Disk Configuration Table 130 (in primary computer system 12) contains a detailed description of valid secondary disk information from secondary storage subsystem 33. The secondary disk information comprises storage device serial numbers, valid storage address ranges, logical control units (LCUs), a subsystem ID for each LCU and a worldwide node name for the disk subsystem (as in the Primary Disk Table). In addition, the Secondary Disk Table specifies the size of each disk volume (which may differ from one to the other in secondary storage subsystem 33 depending on how they were generated), and a "pool" to which each disk volume belongs. "Pool" information is used to group together sets of disk volumes at the secondary storage subsystem for the purpose of ease of recovery.

Tertiary Disk Configuration Table 140 (in primary computer system 12) contains a detailed description of valid tertiary disks in the tertiary subsystem 43 which corresponds to valid secondary disks in the secondary subsystem 33. Tertiary Disk Configuration Table 140 includes specification of disk device serial numbers, valid device internal addressees, LCUs and the size of each volume in the Tertiary Disk Configuration Table. Program 50 uses the information in the Primary, Secondary and Tertiary Disk Configuration Tables to define the correlation/mappings between disk volumes in the different storage subsystems.

Mirror Configuration Table 121 (in primary computer system 12) contains the mappings of the corresponding disk volumes in the Primary, Secondary and Tertiary subsystems 23, 33 and 43 used in the data mirroring. Once program 50 assigns a secondary disk volume and a tertiary disk volume to a primary disk volume, program 50 records these mappings in the Mirror Configuration Table 121.

Topology Configuration Table 122 (in primary computer system 12) includes a description of how the primary storage systems are configured when the primary set of disk volumes are spread amongst more than one storage controller. One storage controller functions as the "master", and all others are "subordinates". The Topology Table includes serial numbers of the "storage controllers", subsystem IDs, physical port connections, and a definition of which is the "master".

Figure 2A:
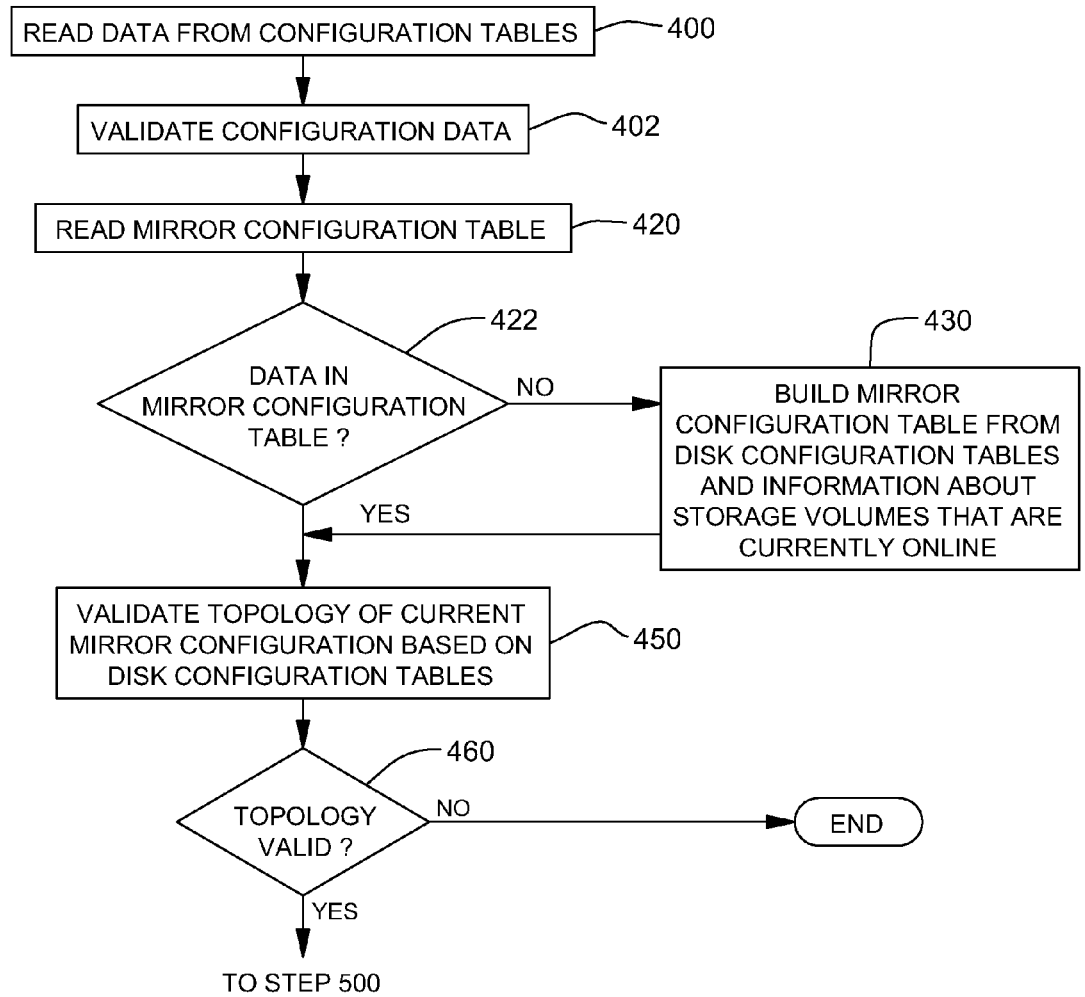
FIGS. 2(A-B) form a flow chart of a data mirroring management program within the primary subsystem, according to the present invention.
Figure 2B:
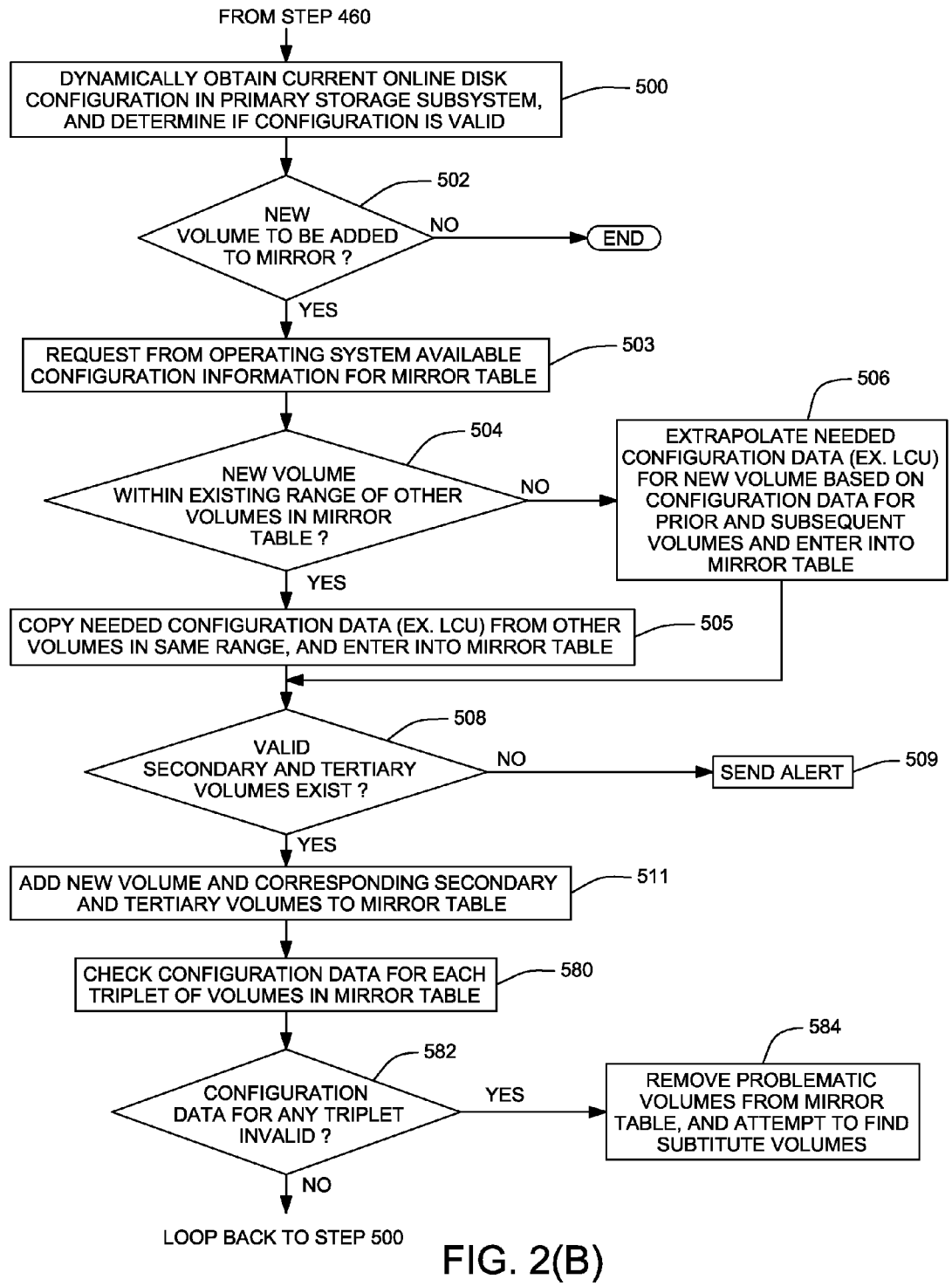

FIG. 2 illustrates function and operation of data mirroring management program 50 in more detail. In step 400, program 50 reads all the configuration information from Primary Disk Configuration Table 120, Secondary Disk Configuration Table 130 and Tertiary Disk Configuration Table 140. Next, program 50 attempts to validate the configuration information for syntax and functionality, as follows (step 402). There are syntax rules for each configuration table, and program 50 checks every record in each file in each configuration table for compliance with the syntax rules. Also, program 50 compares the data in the Primary Disk Configuration Table 120 to what currently exists in the Primary Storage Subsystem 23. Program 50 checks that each volume to be included in the mirror has valid information in the configuration tables, such as a valid LSS number, serial number and SSID. Also, Program 50 checks each entry in the Primary Disk Configuration Table 120, Mirror Configuration Table 121 and Topology Configuration Table 122 using internal operating system commands and structures, to ensure that the definitions included in the configuration table are valid for the system under which they are running. This is done by querying all aspects of the mirror for validity. Also, Program 50 checks each entry in the Secondary Disk Configuration Table 130 (retrieved in step 400) using inband test commands over network 131, to ensure that a valid volume pair is defined in the mirror. Also, Program 50 checks, also using inband commands via the network, that a valid tertiary volume is defined and in a "flashcopy" relationship with the secondary volume. A "flashcopy" relationship is a relationship between the secondary and tertiary volumes where, at given points in time, the data on the secondary volume is very quickly copied to the tertiary volume. This creates a "hardened" point in time copy of the secondary volume data. Flashcopy is a function of the IBM 2105 and 2107 disk subsystems. The information retrieved from the inband test commands as well as the completion of a valid transmission and response to the inband test signals indicate validity of the configurations.

Next, program 50 attempts to read the entries in the Mirror Configuration Table 121 (step 420). If there are no entries in the Mirror Configuration Table 121 (decision 422, yes branch), then program 50 will generate the entries as follows (step 430). Program 50 dynamically obtains disk volume information from Primary Disk Configuration Table 120 for disks available for production purposes by the primary storage subsystem 33. Then, program 50 determines which of these available disks should be included in the mirror based on production definitions established by an administrator. For all disks that should be included in the mirror, program 50 attempts to validate the disk volume address by comparison with the corresponding disk volume identification and address in the Primary Disk Configuration Table 120. If the address of the disk volume is not currently included in the Primary Disk Configuration Table 120, then program 50 queries the local operating system to gather the proper configuration data for the disk volume, as described above. Next, program 50 compares the address of this disk volume to other ranges of addresses in the Primary Disk Configuration Table 120 to determine other configuration information (such as Logical Subsystem number (LSS), Serial Number, and Subsystem ID (SSID) which is not available from the local operating system required to define the mirror. This information is external to the operating system, and must be manually recorded in the configuration tables. If missing from the configuration tables, it must be determined by other means, as follows. Next, program 50 searches the Secondary Disk Configuration Table 130 to find a valid, available disk volume in the Secondary Storage Subsystem 33 of the proper size and placement, i.e. Pool # to which to mirror data from the disk volume in the Primary Storage Subsystem 23. Next, program 50 searches the Tertiary Disk Configuration Table 140 to find a valid, available volume in the Tertiary Storage Subsystem 43 of the proper size and placement to which to mirror data from the disk volume in the Secondary Storage Subsystem 33. After gathering this information from the Secondary Storage Subsystem 33 and Tertiary Storage Subsystem 43, program 50 enters the information in the Mirror Configuration Table 121 along with the corresponding disk volume from the Primary Storage Subsystem to define each triplet of mirrored disk volumes (and complete step 430).

After program 50 generates the Mirror Configuration Table 121 in step 430 or if it already existed (decision 422, no branch), then program 50 attempts to validate the topology, i.e. validate the mappings in the Mirror Configuration Table 121 with the data in Configuration Tables 120, 130, 140, 121 and 122 to determine if the physical structure and interconnection of the storage subsystems is valid (step 450 and decision 460). The topology defines storage subsystem controller relationships at the primary location. When more than a single controller at the primary location is included as part of the mirror, a "master" must be defined, as well as subordinate storage controllers. These controllers must be physically interconnected, and be able to communicate with each other to coordinate the mirroring process. To validate the topology in the Mirror Configuration Table 121, program 50 sends commands to each storage controller, and then processes the returned information. The entries can be invalid in a number of respects (decision 460, no branch). For example, the structure may not match the configuration files. However, if the structure is functioning properly, then program 50 will test the configuration thoroughly by ensuring that the master can communicate with each defined subordinate (step 430). If the structure is not functioning properly, based on tests of either the configuration or the existing structure, then program 50 will send alerts to system personnel and will shut down (step 430).

Next, program 50 begins a process that repeatedly checks the actual mirror as defined by Configuration Tables 120, 130, 140, 121 and 122 as well as update the mirror in case new volumes have been added or existing volumes have been removed. In step 500, program 50 dynamically obtains a list of all disk volumes in primary storage subsystem 23 which are currently "online", i.e. available for productive use at the primary site. In step 500, program 50 also determines if they are properly configured by comparing these online volumes against criteria in the parameter library 115. The parameter library 115 contains user defined options such as filters matching volume names to be included in the mirror, desired synchronization times, physical connectivity information and other information required for program 50 to operate properly. The criteria includes Include filters and Exclude filters that match either the 'volume name' or the 'volume address', and indicate which of the available volumes can properly be included in the mirror. Next, program 50 determines the subset of the online volumes that meet the foregoing criteria and therefore, can be included in the mirror. Program 50 compares the subset of volumes that meet the foregoing criteria to the volumes listed in the Mirror Configuration Table 121 for the primary storage subsystem.

Next, program 50 determines if there are any new disk volumes to be added, i.e. a subset of volumes identified in step 500 that do not appear in the Mirror Database (decision 502). If so (decision 502, yes branch), then program 50 checks the configuration table 121 for information on this volume. Information such as the serial number, worldwide node name, pool number, channel connection address and subsystem ID) for this disk volume are required to add it to the mirror. (step 503). If the address of this new volume is not included in the Configuration table 121, then the information must be obtained through the Extrapolation process. To obtain the configuration data including serial number, logical control unit ("LCU"), Worldwide Nodename, Channel Connection address and pool number not available from the local operating system or the configuration table 121, but required to build the mirror, program 50 will compare the address of this new volume to ranges just prior to, and just after the new volume address located in the Primary Disk Configuration Table (decision 504). If program 50 determines that the new volume would complete a contiguous stream of addresses (from prior range through post range) then Program 50 determines that the new address 'fits' between the two other ranges, and data will be used from those ranges to complete the missing data from the configuration table 121. Thus, program 50 determines if the new volume has an address within a file range known to be valid and used for production data, i.e. the volume prior to and subsequent to the new volume have the same values for serial number, LCU, worldwide node name, pool number, channel connection address and subsystem ID (decision 504, yes branch). In such a case (decision 504, yes branch), then program 50 assumes that the new volume is in the same "range" and has the same values and program 50 automatically adds the disk volume to the Mirror Configuration Table 121 and inserts the same values/parameters as the other disk volumes in the range for serial number, LCU, worldwide node name, pool number, channel connection address and subsystem ID (step 505). Once configuration data has been generated via extrapolation, program 50 obtains a secondary volume from the Secondary Disk Configuration Table 130. Similarly, program 50 identifies from the Tertiary Disk Configuration Table 130 a volume of the proper size and assigns it as the tertiary volume.

Referring back to decision 504, no branch where the new volume does not reside within the same range as other production volumes, then program 50 determines the LCU by extrapolating configuration data for existing volumes that immediately precede and follow the new volume in address, for example, by taking the midpoint (step 506). (Step 506 is illustrated in more detail in FIG. 3, as described below.) Next, program 50 searches the Secondary Disk Configuration Table 130 to find a valid volume of the proper size and placement, to correlate to this new disk volume (step 508). Also in step 508, program 50 searches the Tertiary Disk Configuration Table 140 to find a valid volume of the proper size and placement, to correlate to this new disk volume. If program 50 finds such volumes in the Secondary Disk Configuration Table and the Tertiary Disk Configuration Table (decision 508, yes branch), then program 50 adds to the Mirror Configuration Table 121 the new disk volume in the primary storage subsystem and the corresponding/mapped volumes n the Secondary Disk Configuration Table and Tertiary Disk Configuration Table (step 511). However, if program 50 cannot find such volumes in the Secondary Disk Configuration Table and Tertiary Disk Configuration Table (decision 508, no branch), then program 50 sends an alert to an operator to add physical disks to the Secondary Storage Subsystem or Tertiary Storage Subsystem as needed to map from the new volume in the Primary Storage subsystem (step 509).

Next, program 50 checks each volume in the Mirror Configuration Table 121 to determine that is properly configured, and is being successfully mirrored to the secondary location (step 580 and decision 582). Program 50 determines if each volume is properly configured by making sure that a valid secondary and tertiary volume have been assigned to it in the Mirror Database. Program 50 determines if each volume is being successfully mirrored by querying the primary-secondary PPRC status of each volume via internal operating system interfaces, and also querying secondary-tertiary relationship, also using internal operating system interfaces. If there is a problem with the primary volume i.e. The PPRC status is returned as "SUSPENDED" or "SIMPLEX", this indicates the volume pair is not in a successful mirroring status (decision 582, no branch), then program 50 will (a) attempt to re-establish the mirror relationships. Program 50 will attempt this up to three times. If a successful relationship cannot be sustained, then Program 50 removes from the mirror the primary volume and its counterparts in the secondary storage subsystem and tertiary storage subsystem. Program 50 also marks the secondary and tertiary volumes as 'unavailable'. Program 50 will then assign a free secondary and tertiary volume from the configuration tables, and attempt to mirror the primary volume with the new secondary and tertiary volumes (step 584). If there was a problem with either of the counterparts to a primary volume (decision 582, no branch), then program 50 will identify another volume in the Secondary Disk Configuration Table or another volume in the Tertiary Disk Configuration Table as needed to properly correspond to the volume in the Primary Disk Configuration Table to provide mirroring of the volume in the Primary Storage Subsystem (step 584). In decision 580, program 50 also identifies from a dynamically built list of current primary volumes any volumes in the Mirror Configuration Table 121 that no longer exist in its Storage Subsystem 23 as production volumes. For any such volumes (decision 582, no branch), Program 50 will automatically schedule the volume entry to be removed, pending an "confirmation" command from an administrator.

Figure 3:
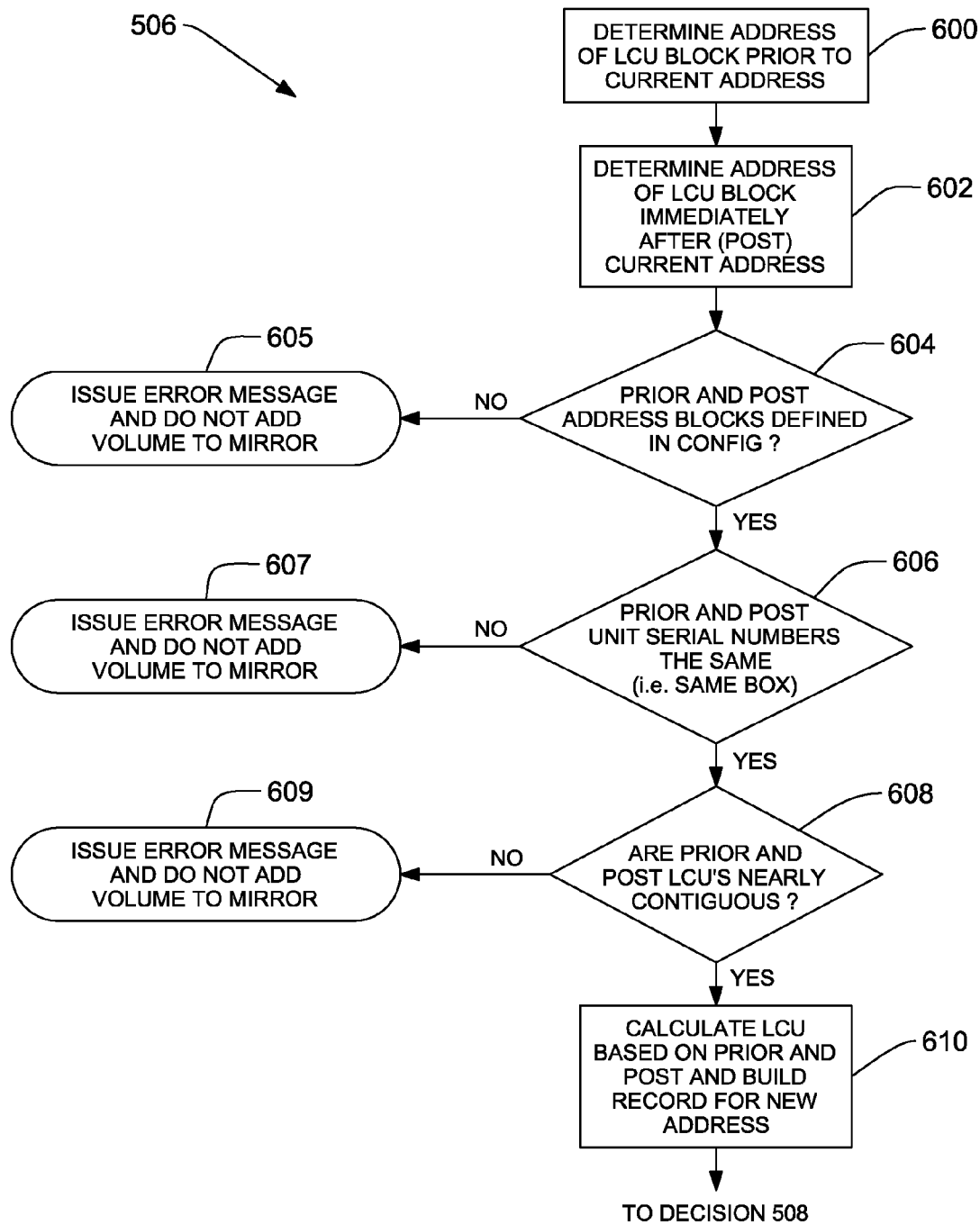
FIG. 3 is a flow chart showing more detail of an extrapolation step of the data mirroring management program of FIGS. 2(A-B).

FIG. 3 illustrates extrapolation step 506 in more detail. As explained above, an extrapolation is needed when there is an attempt to add a new volume to the mirror, but the configuration information for the new volume is missing from the configuration table. In such a case, program 50 will determine from the configuration table the configuration information for the set of addresses immediately preceding the new volume (step 600) and the configuration information for the set of addresses immediately following the new volume (step 602). If either one is not defined in the configuration table (decision 604, not branch), then program 50 will issue an error message and not add the new volume to the mirror (step 605). However, if both the preceding and following volumes are currently defined in the configuration table (decision 604, yes branch), then program 50 determines if the unit serial numbers are the same for the preceding and following volumes (decision 606). If not (decision 606, no branch), then program 50 will issue an error message and not add the new volume to the mirror (step 607). However, if the unit serial numbers are the same for both the preceding and following volumes (decision 606, yes branch), then program 50 determines if the LCUs are within a predetermined proximity of each other, i.e. are nearly contiguous (decision 608). For example, if the preceding LCU number is 5% or less than the following or 'post' LCU number, then the new address is considered to fall between the two LCUs in the configuration table and be sufficiently close to permit extrapolation. In such a case (decision 608, yes branch), a new LCU configuration entry is entered into the table as the midpoint between the LCUs of the preceding and following volumes, along with the other configuration information associated with the LCU i.e. serial number, Worldwide Nodename, etc. For example, if the preceding LCU address is 5400 and the following LCU address is 5600, then Program 50 assigns 5500 to the LCU number for the new volume.

Program 50 can be loaded into primary computer system 12 from a computer readable media such as magnetic tape or disk optical media, DVD, semiconductor memory, etc. or downloaded from the Internet via TCP/IP adapter card 71.

Based on the foregoing, a computer system, method and program for managing data mirror have been disclosed. However, numerous modifications and substitutions can be made without deviating from the scope of the present invention. For example, in some cases, the tertiary storage subsystem is not needed and program 50 includes in the Mirror Configuration Table only entries for the primary storage volumes and corresponding secondary storage volumes. Therefore, the present invention has been disclosed by way of illustration and not limitation, and reference should be made to the following claims to determine the scope of the present invention.

What is claimed:

1. A method for managing a primary storage subsystem and a backup storage subsystem, the method comprising the steps of:

a computer identifying an available storage volume in the primary storage subsystem;

the computer identifying a storage volume in the primary storage subsystem system prior to the available storage volume and another storage volume in the primary storage subsystem subsequent to the available storage volume, and identifying a serial number and a Logical Control Unit (LCU) number of the prior storage volume and a serial number and an LCU number of the subsequent storage volume;

the computer determining if an address range of the available storage volume fills a gap in addresses between an address range of the prior storage volume and an address range of the subsequent storage volume; and if so and the prior storage volume and the subsequent storage volume have a same serial number and a same LCU number, the computer assigning and recording for the available storage volume the same serial number and the same LCU number as the serial number and LCU number for the prior storage volume and the subsequent storage volume, and if not but the prior storage volume and the subsequent storage volume have a same serial number and different LCU numbers, the computer determining an LCU number for the available storage volume based in part on extrapolation between the LCU number of the prior storage volume and the LCU number of the subsequent storage volume, and assigning and recording for the available storage volume the extrapolated LCU number and the same serial number as the serial number for the prior storage volume and the subsequent storage volume.

2. The method of claim 1 further comprising the step of the computer configuring an available storage volume on the backup storage subsystem to mirror the available storage volume on the primary storage subsystem such that data updates to the available storage volume on the primary storage subsystem are copied to the mirrored storage volume on the backup storage subsystem.

3. The method of claim 1 further comprising the steps of:
the computer determining that the difference between the LCU numbers of the prior storage volume and the subsequent volume is within a predetermined limit, as a precondition for the step of determining the LCU number for the available storage volume based in part on extrapolation between the LCU number of the prior storage volume and the LCU number of the subsequent storage volume.

4. The method of claim 1 wherein the computer determines the LCU number for the available storage volume as a midpoint between the LCU number of the prior storage volume and the LCU number of the subsequent storage volume.

5. A computer system for managing a primary storage subsystem and a backup storage subsystem, the computer system comprising:
a CPU, a computer readable memory and a computer readable storage media;
first program instructions to identify an available storage volume in the primary storage subsystem;
second program instructions to identify a storage volume in the primary storage subsystem system prior to the available storage volume and another storage volume in the primary storage subsystem subsequent to the available storage volume, and identify a serial number and a Logical Control Unit (LCU) number of the prior storage volume and a serial number and an LCU number of the subsequent storage volume;
third program instructions to determine if an address range of the available storage volume fills a gap in addresses between an address range of the prior storage volume and an address range of the subsequent storage volume, and
if so and the prior storage volume and the subsequent storage volume have a same serial number and a same LCU number, assign and record for the available storage volume the same serial number and the same LCU number as the serial number and LCU number for the prior storage volume and the subsequent storage volume, and if not but the prior storage volume and the subsequent storage volume have a same serial number and different LCU numbers, determine an LCU number for the available storage volume based in part on extrapolation between the LCU number of the prior storage volume and the LCU number of the subsequent storage volume, and assign and record for the available storage volume the extrapolated LCU number and the same serial number as the serial number for the prior storage volume and the subsequent storage volume; and wherein
the first, second and third program instructions are stored on the computer readable storage media for execution by the CPU via the computer readable memory.

6. The computer system of claim 5 wherein the third program instructions configure an available storage volume on the backup storage subsystem to mirror the available storage volume on the primary storage subsystem such that data updates to the available storage volume on the primary storage subsystem are copied to the mirrored storage volume on the backup storage subsystem.

7. The computer system of claim 5 wherein:
the third program instructions determine that the difference between the LCU numbers of the prior storage volume and the subsequent volume is within a predetermined limit, as a precondition to determining the LCU number for the available storage volume based in part on extrapolation between the LCU number of the prior storage volume and the LCU number of the subsequent storage volume.

8. The computer system of claim 5 wherein the third program instructions determine the LCU number for the available storage volume as a midpoint between the LCU number of the prior storage volume and the LCU number of the subsequent storage volume.

9. A computer program product for managing a primary storage subsystem and a backup storage subsystem, the computer program product comprising:
a computer readable storage media;
first program instructions to identify an available storage volume in the primary storage subsystem;
second program instructions to identify a storage volume in the primary storage subsystem system prior to the available storage volume and another storage volume in the primary storage subsystem subsequent to the available storage volume, and identify a serial number and a Logical Control Unit (LCU) number of the prior storage volume and a serial number and an LCU number of the subsequent storage volume;
third program instructions to determine if an address range of the available storage volume fills a gap in addresses between an address range of the prior storage volume and an address range of the subsequent storage volume, and
if so and the prior storage volume and the subsequent storage volume have a same serial number and a same LCU number, assign and record for the available storage volume the same serial number and the same LCU number as the serial number and LCU number for the prior storage volume and the subsequent storage volume, and
if not but the prior storage volume and the subsequent storage volume have a same serial number and different LCU numbers, determine an LCU number for the available storage volume based in part on extrapolation between the LCU number of the prior storage volume and the LCU number of the subsequent storage volume, and assign and record for the available storage volume the extrapolated LCU number and the same serial number as the serial number for the prior storage volume and the subsequent storage volume; and wherein the first, second and third program instructions are stored on the computer readable storage media.

10. The computer program product of claim 9 wherein the third program instructions configure an available storage volume on the backup storage subsystem to mirror the available storage volume on the primary storage subsystem such that data updates to the available storage volume on the primary storage subsystem are copied to the mirrored storage volume on the backup storage subsystem.

11. The computer program product of claim 9 wherein:

the third program instructions determine that the difference between the LCU numbers of the prior storage volume and the subsequent volume is within a predetermined limit, as a precondition to determining the LCU number for the available storage volume based in part on extrapolation between the LCU number of the prior storage volume and the LCU number of the subsequent storage volume.

12. The computer program product of claim 9 wherein the third program instructions determine the LCU number for the available storage volume as a midpoint between the LCU number of the prior storage volume and the LCU number of the subsequent storage volume.

\* \* \* \* \*